United States Patent Office 3,134,789
Patented May 26, 1964

3,134,789
LITHIUM DECABORANE TETRAHYDROFURAN ADDUCT
Theodore L. Heying, Tonawanda, N.Y., assignor to Olin Mathieson Chemical Corporation, a corporation of Virginia
No Drawing. Filed Sept. 24, 1958, Ser. No. 763,144
2 Claims. (Cl. 260—346.1)

This invention relates to the preparation of the new adduct, lithium decaborane tetrahydrofuran $$Li_3B_{10}H_{14} \cdot C_4H_8O$$

More in particular, this invention relates to the preparation of the lithium decaborane tetrahydrofuran adduct by the direct reaction of lithium and decaborane while they are dissolved in a mixture of tetrahydrofuran and naphthalene. The reaction is generally conducted at a temperature from −60° C. to +40° C. This reaction is expressed by the equation:

$$3Li + B_{10}H_{14} \xrightarrow{C_4H_8O} Li_3B_{10}H_{14} \cdot C_4H_8O$$

The lithium decaborane tetrahydrofuran adduct is a white hygroscopic solid which has a melting point above 100° C. It is soluble in tetrahydrofuran and in water with slow decomposition.

The lithium decaborane tetrahydrofuran adduct of this invention can be incorporated with suitable oxidizers such as ammonium perchlorate, potassium perchlorate, sodium perchlorate, lithium perchlorate, aluminum perchlorate, ammonium nitrate, etc. and a binder, to yield a solid propellant suitable for rocket power plants and other jet propelled devices. Such propellants burn with high flame speeds, have high heats of combustion and are of the high specific impulse type. The lithium decaborane tetrahydrofuran adduct when incorporated with oxidizers is capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following examples illustrate the invention.

Example I

A solution of 2.0 g. of decaborane in tetrahydrofuran, total volume 18 ml., was added slowly to a blue solution of 0.45 g. (0.064 mole) lithium and 8.2 g. of naphthalene in approximately 75 ml. of tetrahydrofuran. The blue color of the solution disappeared when 16 ml. of the decaborane solution had been added. After the addition of the decaborane, part of the tetrahydrofuran was removed by distillation and to the remaining solution was added about 2 times its volume of petroleum ether. Two layers formed; a clear petroleum ether layer on top and a gummy, yellow layer on the bottom. The clear petroleum ether layer was decanted and the gummy lower layer was washed with petroleum ether and then with benzene. Two layers again formed. These layers were separated and the lower, tetrahydrofuran, was heated to 100° C. under vacuum. A light green to white solid remained. This solid was pulverized and heated at 100° C. at an absolute pressure of $5 \times 10^{-3}$ mm. of mercury for two hours, but not loss of weight occurred. Two analyses of this solid showed that it contained 34.6, 36 percent boron and 7.8, 8.0 percent lithium. This corresponds to a boron lithium ratio of 10/3.5, which corresponds to a compound having the formula $$Li_{3.5}B_{10}H_{14} \cdot 2(C_4H_8O)$$

Example II

Lithium, 0.56 g., was dissolved in 75 ml. of tetrahydrofuran containing 10.2 g. of naphthalene. A solution of 5 g. of decaborane in approximately 75 ml. of tetrahydrofuran was added to this solution until the blue color was discharged leaving a yellow solution. An equal volume of benzene, approximately 100 ml., was added and the mixture was distilled. A mixture of tetrahydrofuran and benzene was collected at 70° C., probably an azeotrope. The residual liquid was distilled under reduced pressure and the remaining residue was washed thoroughly three times with benzene to remove all of the naphthalene. After filtration and the maintenance of the material under reduced pressure, 3.2 g. of a white solid was obtained. Two elemental analyses of the solid showed that it contained 45.8, 47.1 percent boron and 9.09, 8.99 percent lithium. These analyses compare favorably for the compound $Li_3B_{10}H_{14} \cdot C_4H_8O$.

The proportion of naphthalene in admixture with tetrahydrofuran can vary widely but generally constitutes from about 10 to 35 percent by weight of the solvent mixture.

In addition to the lithium decaborane tetrahydrofuran adducts described in Examples I and II, other lithium decaborane tetrahydrofuran adducts can be prepared by dissolving in tetrahydrofuran the lithium decaborane ammonia adducts described in my application Serial No. 763,146 filed of even date herewith and refluxing until ammonia evolution ceases.

Also lithium decaborane ammonia adducts can be prepared by dissolving the lithium decaborane tetrahydrofuran adducts in tetrahydrofuran and passing excess ammonia gas through the resulting solution while it is being cooled and evaporated.

The boron-containing solid materials produced by practicing the method of this invention can be employed as an ingredient of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing lithium decaborane adducts, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided lithium decaborane adduct can be admixed with a high solids content solution of a partially condensed urea-formaldehyde or phenol-formaldehyde resin, the proportions being such that the amount of the resin is about 5 to 10 percent by weight, based upon the weight of the oxidizer and lithium containing compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:

1. A method for the preparation of a lithium decaborane tetrahydrofuran adduct which comprises reacting lithium metal and decaborane at a temperature of from $-60°$ to $+40°$ C. while the reactants are dissolved in a mixture of tetrahydrofuran and naphthalene, and thereafter recovering the adduct from the reaction mixture.

2. An adduct of the formula $Li_3B_{10}H_{14} \cdot C_4H_8O$.

No references cited.